United States Patent Office.

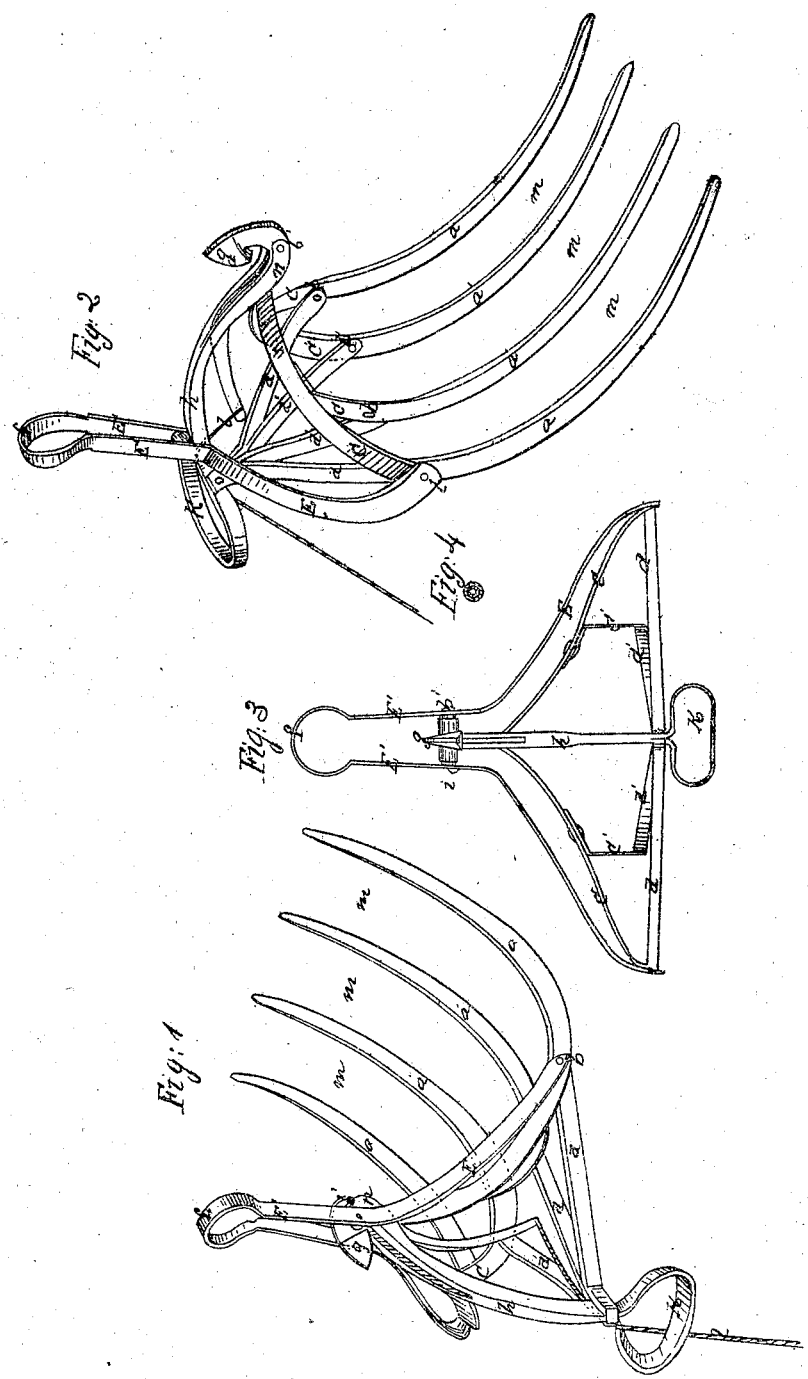

NELSON PALMER, OF ALBANY, NEW YORK.

Letters Patent No. 74,934, dated February 25, 1868.

IMPROVEMENT IN HORSE HAY-FORKS.

*The Schedule referred to in these Letters Patent and making part of the same.*

TO ALL WHOM IT MAY CONCERN:

Be it known that I, NELSON PALMER, of Albany, in the county of Albany, and State of New York, have invented new and useful Improvements in Horse Hay-Forks; and I do hereby declare that the following is a full and complete description of the construction and operation of the same, reference being had to the accompanying drawings, making part of this specification, in which—

Figure 1 is a perspective view, with the tines elevated and held in place by the catch.

Figure 2 is a view with the catch released; and

Figure 3 is a sectional view.

Like letters refer to like parts in the several views.

The tines $a$ are slightly curved and parallel from the joints backward to the bolts $b$, where the prolongations of the tines $a$ become braces, $c$. The two outside braces $c$ converge at the top, and are connected with the handle $h$, and, passing above the arc of a circle described by the handle $h$, become the elevated points of fastening for the catch. The inside braces $c'$ are bolted firmly to the under part of the outside braces $c$, in such manner as to make the spaces $m$ between the tines equal. The handle $h$, from the point of contact with the braces $c$, forms the arc of a circle, equal in length to the radius of said circle, having the bolt $b$ at the lower extremity of the outside brace $c$ as its centre. From the top the handle $h$ is parted a sufficient length to allow the proper action of the catch. At a point near the lower and outer end of the handle $h$ are bolted to it braces $d'$, which extend forward and diverge so that they severally come in contact with the lower extremity of the braces $c$ at their junction with the base of the tines $a$, and are fastened by the bolts $b$ firmly together at that point. At the same point, on the outside, are hinged the lower extremities of the bail $e$, which, curving in conformity with the braces $c$, converge at the top of the handle $h$, and extend upward parallel to each other a sufficient distance apart to allow the handle $h$ to move freely between them. The height of the bail $e$ is equal to the length of the tines $a$. Between the parallel sides $e'$ of the bail is placed a roller, $i$, at such a point near the handle $h$ as to allow the bail $e$ to move freely along the handle $h$ without bringing the roller $i$ in contact with it, except at the top. There it is made to fit into a concavity in the back edges of the elevated joints $n$, the front edges being convex or rounded. Between these joints $n$ is placed a catch, $g$, hinging on a bolt, $b'$. This catch, $g$, is of peculiar construction. It is so curved as, when drawn by the cord $l$, to pass between the open parts of the handle $h$, and to protrude above the upper edges so far and in such manner that when the bail $e$ is passing into position the roller $i$ forces the catch down until the bail $e$, having reached its upright position, and the roller $i$ its concave limit, the catch $g$ is compelled to lock over the roller $i$ and sustain the fork in a working attitude, the location of the hinging bolt $b'$ above the roller $i$ contributing to this result. By making that part of the catch $g$ working over the roller $i$ broad, as shown in the drawings, the strain on the centre of the roller $i$ is diminished, and the greater durability of both secured. The construction of the roller $i$ is unique, and serves the double purpose to support the bail $e$ and diminish friction of the catch $g$. To accomplish this there is an inside tube or sleeve, next to the bolt $b'$, a little longer than the outside roller $i$. Against the ends of this sleeve the sides $e'$ of the bail are firmly pressed by the bolt $b'$, so that the bail $e$ is secured against contracting when heavily strained, and the anti-friction roller allowed to work freely under all circumstances. In the top of the bail $e$ is a loop, $f$, to which the power is applied, and at the lower extremity of the handle $h$ the loop $k$ is for convenience in operating the fork.

This fork is designed to combine capacity, compactness, simplicity, strength, efficiency, and durability. By the proximate coincidence of the braces $c$ and $c'$ and $d$ and $d'$, and the absence of any cross-bar, its capacity is increased by allowing the tines $a$ and $a'$ to be pressed further into the hay. From the construction and relation of the braces $c$ and $c'$ and $d$ and $d'$, the bail $e$, and the handle $h$, it is adapted to work through small spaces or openings, and among beams, without the usual liability to be obstructed by them.

What I claim as my invention, and desire to secure by Letters Patent, is—

1. The combination of the tines $a$ and $a'$, the braces $d$ and $d'$, and the handle $h$, when constructed and arranged substantially as and for the purpose set forth.

2. The combination of the tines $a$ and $a'$ and braces $d$ and $d'$, the handle $h$, the catch $g$, and the roller $i$, when constructed and arranged substantially as and for the purpose set forth.

3. I claim the catch $g$, constructed and pivoted as described, so as to be locked by the action of the roller $i$ against the catch $g$, below its pivot, substantially as described.

4. I claim the roller $i$, constructed as described, in combination with a catch, substantially as and for the purpose set forth.

N. PALMER.

Witnesses:
 D. P. HOLLOWAY,
 WM. H. BATES.